United States Patent
Yoon et al.

(10) Patent No.: US 8,600,031 B2
(45) Date of Patent: Dec. 3, 2013

(54) METHOD FOR CONNECTING CALLS BETWEEN AN IP MULTIMEDIA SUBSYSTEM (IMS) DOMAIN AND A CIRCUIT SWITCHED (CS) DOMAIN

(75) Inventors: Kyung-Ae Yoon, Gyeonggi-do (KR); Jae-Seung Song, Seoul (KR); Mi-Seon Ra, Seoul (KR)

(73) Assignee: LG Electronics Inc., Seoul (KR)

( * ) Notice: Subject to any disclaimer, the term of this patent is extended or adjusted under 35 U.S.C. 154(b) by 764 days.

(21) Appl. No.: 12/304,970

(22) PCT Filed: May 28, 2007
(Under 37 CFR 1.47)

(86) PCT No.: PCT/KR2007/002570
§ 371 (c)(1),
(2), (4) Date: Aug. 4, 2010

(87) PCT Pub. No.: WO2007/145434
PCT Pub. Date: Dec. 21, 2007

(65) Prior Publication Data
US 2012/0177194 A1    Jul. 12, 2012

Related U.S. Application Data

(60) Provisional application No. 60/814,062, filed on Jun. 16, 2006.

(30) Foreign Application Priority Data

Mar. 27, 2007   (KR) .......................... 10-2007-0029859

(51) Int. Cl.
*H04M 3/46* (2006.01)
*H04M 3/58* (2006.01)
*H04L 12/16* (2006.01)
*H04L 12/66* (2006.01)
*H04W 4/16* (2009.01)

(52) U.S. Cl.
USPC ...... 379/211.02; 370/259; 370/352; 370/401; 379/212.01; 455/414.1; 455/417; 455/435.1

(58) Field of Classification Search
None
See application file for complete search history.

(56) References Cited

U.S. PATENT DOCUMENTS

| | | | |
|---|---|---|---|
| 6,590,969 B1 * | 7/2003 | Peters et al. | 379/211.02 |
| 6,931,453 B2 | 8/2005 | Aarnos et al. | |
| 6,954,654 B2 | 10/2005 | Ejzak | |
| 8,340,081 B2 * | 12/2012 | Salkintzis et al. | 370/352 |
| 2005/0190772 A1 * | 9/2005 | Tsai et al. | 370/395.52 |

(Continued)

FOREIGN PATENT DOCUMENTS

KR   10-2002-0089846 A    11/2002

(Continued)

*Primary Examiner* — Harry Hong
(74) *Attorney, Agent, or Firm* — Birch, Stewart, Kolasch & Birch, LLP (57) ABSTRACT

A call connection method is provided. When a terminal is in an IMS unregistered state, information indicating whether to perform a session transfer toward a CS domain is stored in a server during a registration or deregistration process. When receiving a call connection request message over an IMS, if the terminal is in the IMS unregistered state and the information indicates the session transfer, the call transfer toward the CS domain can be performed.

16 Claims, 7 Drawing Sheets

(56) References Cited

U.S. PATENT DOCUMENTS

| | | |
|---|---|---|
| 2007/0047529 A1* | 3/2007 | Ricciardi et al. ............. 370/356 |
| 2007/0243876 A1* | 10/2007 | Duan ............................ 455/445 |
| 2008/0132231 A1* | 6/2008 | Balasubramanian ...... 455/435.1 |
| 2008/0153490 A1* | 6/2008 | Lee et al. .................... 455/435.1 |
| 2012/0120914 A1* | 5/2012 | Sedlacek et al. ............. 370/331 |

FOREIGN PATENT DOCUMENTS

| | | |
|---|---|---|
| KR | 10-2004-0090023 A | 10/2004 |
| KR | 10-2005-0005804 A | 1/2005 |
| KR | 10-2005-0060634 A | 6/2005 |
| KR | 10-2005-0078597 A | 8/2005 |

* cited by examiner

METHOD FOR CONNECTING CALLS BETWEEN AN IP MULTIMEDIA SUBSYSTEM (IMS) DOMAIN AND A CIRCUIT SWITCHED (CS) DOMAIN

This application is the National Phase of PCT/KR2007/002570 filed on May 28, 2007, which claims priority under 35 U.S.C. 119(e) to U.S. Provisional Application No. 60/814,062 filed on Jun. 16, 2006 and under 35 U.S.C. 119(a) to Patent Application No. 10-2007-0029859 filed in Republic of Korea on Mar. 27, 2007, all of which are hereby expressly incorporated by reference into the present application.

TECHNICAL FIELD

The present invention relates to a method for connecting a call between an IMS domain and a CS domain.

BACKGROUND ART

Unregistered services refer to services performed instead of a session requested by a calling party, although the calling party requests to establish the session via an IMS domain with a target UE (User Equipment), since the target UE has unregistered in the IMS domain. Here, the term "unregistered" means a state that the registration in the IMS domain has not been done. For example, the unregistered services may include a Call Forward service, a Voice Mailbox service, and the like. These unregistered services are based upon subscription. That is, the unregistered services are performed only after a UE has subscribed the corresponding services.

The subscription based unregistered service under an existing IMS framework was processed according to an iFC (Initial Filter Criteria) in an S-CSCF (Serving-Call Session Control Function). That is, once an IMS UE (User Equipment) (or, IMS terminal) has subscribed an unregistered service, the corresponding information is stored in a HSS (Home Subscriber Server). In particular, the HSS records that the IMS UE has subscribed in the unregistered service and generates the iFC for the IMS UE. Therefore, when the IMS UE, which has subscribed the unregistered service, is in unregistered state to IMS domain, and when the S-CSCF receives a request for establishing a session with the UE, the S-CSCF can receive information (contents) related to the corresponding unregistered service from the HSS to transfer the session to an AS (Application Server).

Hereinafter, how to process a Call Forward among the IMS unregistered services will be described with reference to FIG. 1. The Call Forward is a representative IMS unregistered service. Preconditions as follows may be required in order to execute the service.
 UE-B has subscribed a Call Forward service and but is in an unregistered state to an IMS domain.
 UE-B has set a Call Forward for a session received from UE-A.
 UE-B has set a Call Forward for every session received.

Upon subscribing the Call Forward service, iFC is installed in the HSS so as to enable performing of a triggering logic for the service.

Figure 1:
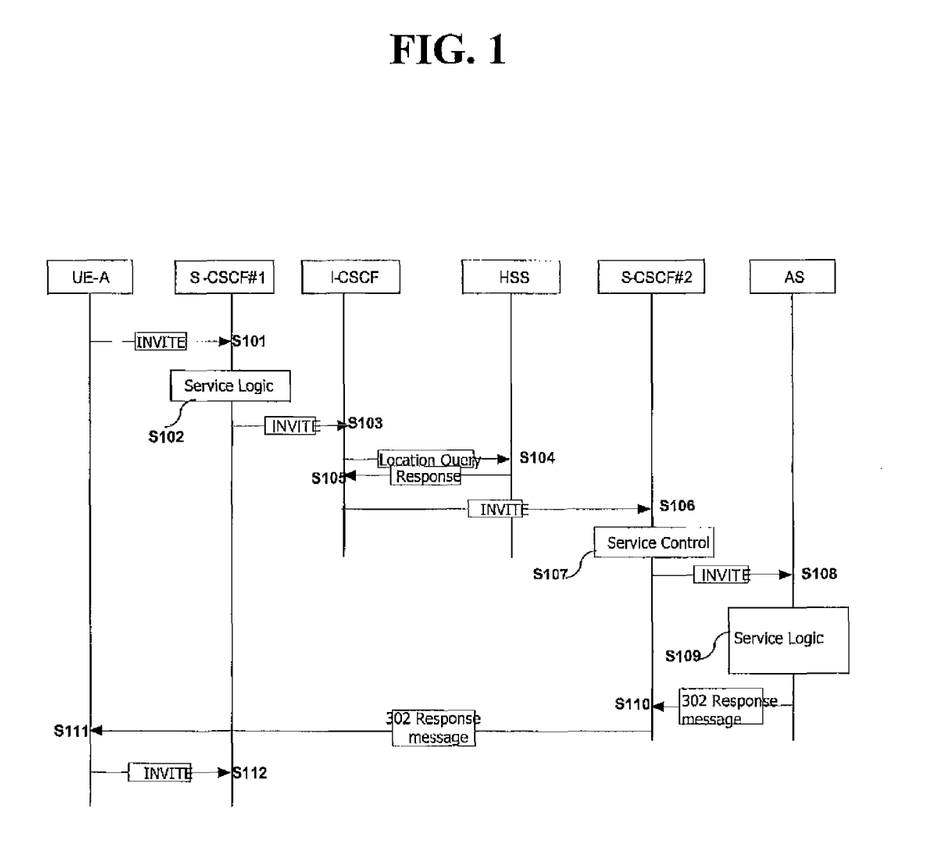
FIG. 1 is a block diagram illustrating a call forwarding process in an IMS according to the related art.

FIG. 1 is a block diagram illustrating a Call Forwarding process in an IMS domain according to the related art. For the sake of explanation, the components in FIG. 1, such as HSS, I-CSCF and S-CSCF will be briefly described.

First, the HSS is a user information database evolved from HLR. The HSS supports IMS entities performing session control. The HSS stores user-related subscription information related to a multimedia session control, namely, user profile information including user position information, security information for user authentication and user permission and a user-subscribed service. The HSS uses DIAMETER protocols (e.g., Cx, Dx and Sh interfaces).

The CSCF is a type of SIP (Session Initiation Protocol) server which processes a SIP signal in an IMS. The I-CSCF of the CSCFs is located at the boundary of a management domain when no border function exists. The I-CSCF provides an IP address thereof to a DNS of a domain such that a server in another domain finds the I-CSCF to use it as an input node of a network. The I-CSCF uses the DIAMETER (e.g., Cx, Dx and Sh interfaces) to query the HSS as to the user's location and transfers a SIP message to a S-CSCF serving for the user, which is known by the querying.

The S-CSCF is generally one of SIP servers as a central node of a signal layer to perform a session control. The S-CSCF always belongs to a home network. The S-CSCF may download a user profile from the HSS or upload it in the HSS using the DIAMETER (Cx and Dx interfaces). The S-CSCF also binds the user's location and the SIP address, upon the SIP registration by the user. In addition, the S-CSCF is included in a path of every signal message to thusly inspect every message, determines a server to provide a service, routes a SIP message to an application server and performs policies of a network operator.

Referring to FIG. 1 to explain the Call Forwarding process in the IMS according to the related art, UE-A sends an INVITE request to a S-CSCF#1 (S101). The S-CSCF#1 having received the INVITE request performs a service logic to obtain an address of an I-CSCF (Interrogating-Call Session Control Function) allocated thereto (S102). The S-CSCF forwards the INVITE to the I-CSCF with the obtained address (S103).

After receiving the INVITE, the I-CSCF sends a location query for location (position) information on a termination UE to the HSS (S104). The HSS then sends the location information on the termination UE to the I-CSCF in response to the query (S105). The location information may include an address of an S-CSCF to which the INVITE is to be sent. After receiving the response, the I-CSCF sends the INVITE to an S-CSCF#2 using the address received from the HSS (S106).

The S-CSCF#2 receives the INVITE message and then receives a user profile from the HSS. And, the S-CSCF#2 performs a service control based upon an iFC stored in the user profile (S107). The iFC may include several information related to an unregistered service subscribed by the user. The corresponding iFC may also include an address of an AS which is capable of performing the Call Forward. The S-CSCF#2 sends the INVITE message to the AS with the address of the AS included in the iFC (S108).

The AS having received the INVITE performs a service logic for the Call Forward (S109). After performing the Call Forward function, the AS generates a response message indicating that a call should be forwarded to a specific address and sends the generated response to the S-CSCF#2 (S110).

The S-CSCF#2 transfers the response message to the UE-A (S111). The UE-A having received the response message re-sends the INVITE to the specific address included in the response message (S112).

The iFC previously mentioned will now be described in more detail.

The iFC filtering may be used to process an initial SIP request. The S-CSCF may use the iFC in order to determine whether to process the received SIP request. The iFC may be stored in the HSS together with the user profile for management. The S-CSCF may receive the iFC from the HSS when the S-CSCF receives a request for registering in the IMS from an UE or when the S-CSCF receives an INVITE message for the unregistered service. The iFC is available in the S-CSCF for the user's registration period. The iFC may include information as follows.

AS address: This is an AS address to be accessed for a specific subscriber.

Default handling: This includes contents (information) as to whether to give up a trigger having low priority, to open conversation or the like.

Trigger point: This is information received from the HSS and defines SPT for a specific application. The S-CSCF analyzes filter criteria when receiving an initial SIP request. When the initial SIP request is identical to specific filter criteria, the S-CSCF performs a function of delivering (proxying) the request to a predefined SIP AS or the like.

As described above, in the unregistered service procedure according to the related art, a user performs the subscription to the corresponding service and then information related thereto is stored in the so-called HSS with an IMS framework in a format of iFC. Generally, the S-CSCF receives a user profile by accessing the HSS. That is, the S-CSCF evaluates the iFC when receiving an initial request. Even for this, the corresponding triggering point should be previously installed in the iFC by the registration.

However, since a CSI (combination of CS (Circuit Switching) and IMS (IP Multimedia Subsystem)) is a non-subscription based service, no iFC for the CSI exists separately. Accordingly, in case of a CSI interworking, namely, in case where an IMS UE sends an initial request to a CSI UE, if the CSI UE is in unregistered state to IMS domain, an IMS domain may send a response message such as 400 Fail or the like to the IMS UE.

Figure 2:
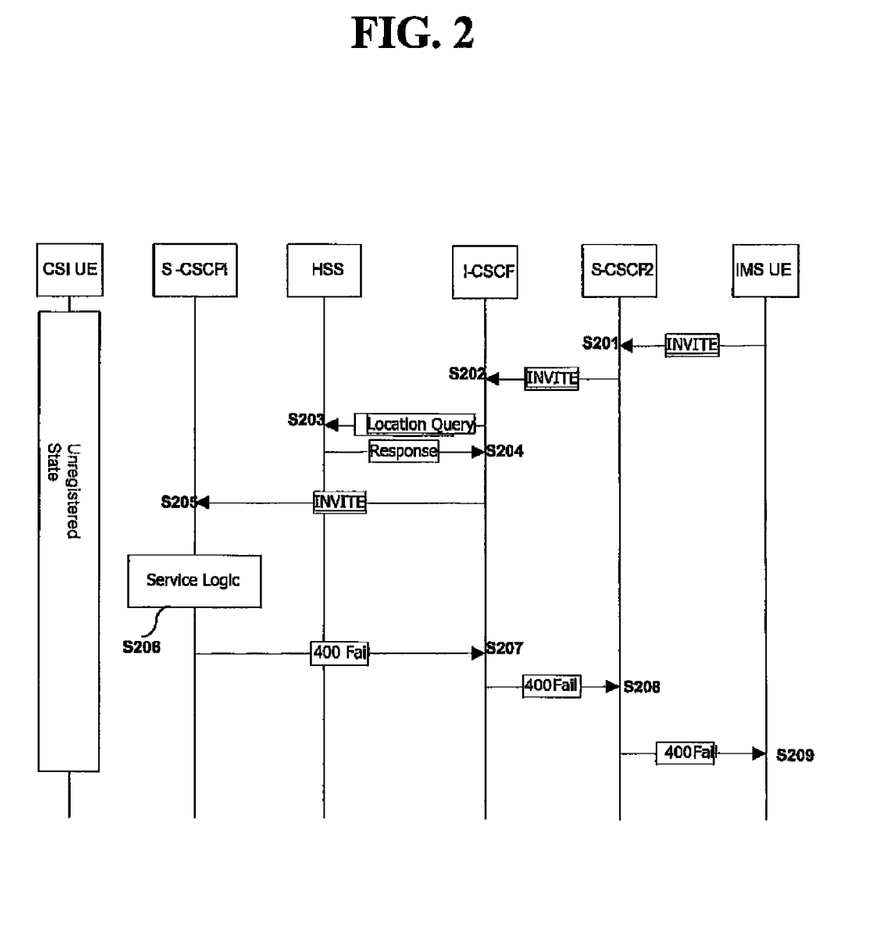
FIG. 2 is a block diagram illustrating a process in which an initial request received from an IMS UE is failed under an unregistered state of a CSI UE.

A detailed example therefor is illustrated in FIG. 2.

FIG. 2 is a block diagram illustrating a process in which an initial request received from an IMS UE is failed since a CSI UE is in an unregistered state.

The procedures illustrated in FIG. 2 are performed as follows.

An IMS UE is in an IMS registered state but a CSI UE is in an IMS unregistered state.

The CSI UE has no subscription for an unregistered service (e.g., Call Forward, Voice Mail Box, etc.).

As illustrated in FIG. 2, the IMS UE sends an INVITE request for the communication with the CSI UE to the S-CSCF2 (S201).

The S-CSCF2 performs a service logic, and then the S-CSCF#2 acquires an address of an I-CSCF. The S-CSCF2 sends the INVITE to the I-CSCF using the acquired address (S202).

The I-CSCF sends a location query to the HSS in order to obtain location information related to a termination UE (S203). The I-CSCF then receives the location information related to the termination UE from the HSS in response to the location query. The location information may include the address of an S-CSCF to which the INVITE message is to be sent. The I-CSCF sends the INVITE message to the S-CSCF1 by the address included in the information received from the HSS (S205).

The S-CSCF1 receives a user profile from the HSS and performs a service logic based upon the iFC stored in the user profile (S206). The iFC may include several information related to many services subscribed by the user. Here, the iFC indicates that the CSI UE is currently in an IMS unregistered state and has not subscribed an unregistered service. The S-CSCF1 does not find an iFC matched with the initial SIP request received and thus sends a Fail message to the I-CSCF (S207).

The I-CSCF having received the Fail message sends a Fail response message to the S-CSCF2 (S208). The S-CSCF2 then forwards the Fail response message to the IMS UE (S209).

As mentioned above, even if the termination side is the CSI UE, since the CSI UE is in the IMS unregistered state, it fails to set up a session. That is, since the CSI is a non-subscription based service, no method has been provided to send an initial request received from an IMS domain to a CS domain in case of the unregistered state of the CSI UE.

DISCLOSURE OF THE INVENTION

Therefore, it is an object of the present invention to provide a call connection method by which a call is transferred to a CS domain according to information as to whether to perform a session transfer in case of receiving a call connection request message via an IMS under the state that a terminal is in an IMS unregistered state.

MODES FOR CARRYING OUT THE PREFERRED EMBODIMENTS

To achieve this aspect, there is provided a method for connecting a call in a server for performing a call connection function with respect to at least one terminal, the method comprising: receiving a first domain call connection request message for at least one target terminal from at least one terminal; checking user profile information related to the target terminal; and selectively performing a call transfer toward a second domain based upon the user profile information.

In accordance with another aspect of the present invention, there is provided a method for connecting a call comprising: transferring a message including information as to a call transfer operation toward a second domain to a server during a deregistration of a first domain; receiving a call connection request message via the second domain from the server; and sending a response message for the received call connection request message to the server.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents. Also, the same reference numerals in the drawings define the same elements.

In general, the term "deregistration" means an action that an IMS UE which has already registered in an IMS domain releases its registration in the IMS domain. Thus, when a CSI UE is in an IMS unregistered state through a deregistration process, the present invention may support a call transfer from an IMS domain toward a CS domain according to setup information indicating whether to perform a session transfer toward the CS domain.

It is possible in the deregistration process to provide a network with information indicating that a CSI UE can receive a call connection request message via a CS domain instead of an IMS domain, although a calling party sends the message via the IMS domain.

In order to transfer a session toward a CS domain even when a CSI UE has been unregistered in an IMS Domain, an IMS core should have a criteria for determining whether to transfer the session. For this, in the deregistration, the CSI UE should inform the network of related information, namely, information indicating that it is a CSI UE and it desires to receive a communication service over a CS domain even in the deregistered state.

To achieve this, the present invention will exemplarily provide a first method of using an existing CSI capability indicator, a second method of using a new CSI deregistration indicator based upon uses (purposes) and a third method of storing a CSI capability indicator received during a registration process in a S-CSCF and using the indicator.

The first exemplary method of using the existing CSI capability indicator will now be described with reference to FIG. 3.

Figure 3:
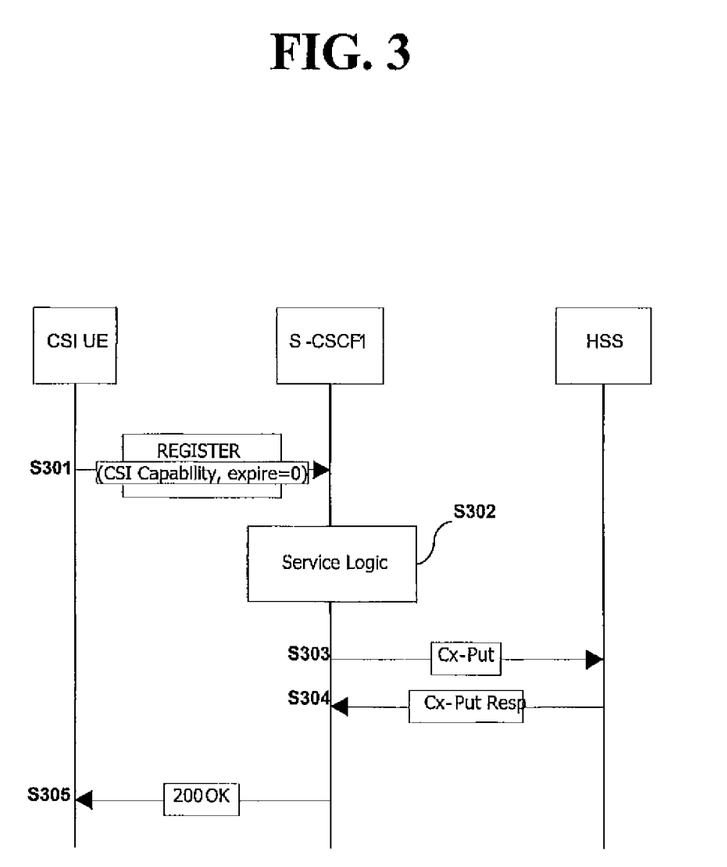
FIG. 3 is a block diagram illustrating an example of deregistration according to the present invention.

FIG. 3 is a block diagram illustrating an example of deregistration according to the present invention. Prior to describing the example of FIG. 3, a CSI UE sends to an IMS core a so-called 'CSI capability' indicator in order to inform the CSI AS of its CSI capability during a registration process. Similarly in an exemplary deregistration method of FIG. 3, the CSI capability indicator of the registration process can be used even in a deregistration process in order to inform the IMS core that it is the CSI UE and to request to transfer a session toward a CS domain under an unregistered state. The CSI capability indicator may be used during the deregistration process in a different manner. That is, during the deregistration process, the CSI capability indicator is used to inform a S-CSCF that the corresponding UE is the CSI UE and to request to transfer a session under an unregistered state of the UE Explaining the deregistration method with reference to FIG. 3, the CSI UE sends to a S-CSCF1 a deregistration message including a CSI capability, or a REGISTER message including not only a CSI capability but also an indicator for deregistration, i.e., an expiration time set to '0' for deregistration (i.e., 'REGISTER (CSI capability, expire=0)' message) (S301). The value '0' of the expiration time (i.e., a continual time of a register) denotes the state that the continual time of the register is 0, namely, a deregistered state. The CSI capability information denotes that the corresponding UE is the CSI UE.

The S-CSCF1 receives the deregistration message (or, 'REGISTER (CSI capability, expire=0)' message) and then performs the deregistration so as to delete every profile related to a public user identity desiring to be deregistered (S302).

The S-CSCF1 sends to an HSS a command of 'Cx-Put (public user identity, private user identity and keep S-CSCF name)' including state-changed contents for storing an S-CSCF name in the HSS for a CSI interworking (S303). The HSS sends a response with respect to the Cx-Put to the S-CSCF1 (S304). Here, each parameter of the 'Cx-Put (i.e., public user identity, private user identity and keep S-CSCF name)' denotes as follows: The public user identity is the public user identity of the CSI UE which performs the deregistration. The public user identity may be stored in order to perform the CSI interworking under the unregistered state. The private user identity is the private user identity of the CSI UE to perform the deregistration. The public user identity is an ID useable for an end user, while the private user identity is an ID usable in a network. Also, the keep S-CSCF name denotes information including the name of an S-CSCF having an iFC for the CSI interworking of the CSI UE which performs the deregistration. The parameters will be re-described later.

The S-CSCF1 sends a response to the CSI UE to inform the successful deregistration (S305). By completely performing the steps of S301 to S305, the deregistration method of the terminal according to the first embodiment can be implemented.

Hereinafter, another embodiment using a new 'CSI deregistration' indicator according to uses (purposes) will be described with reference to FIG. 4.

Figure 4:
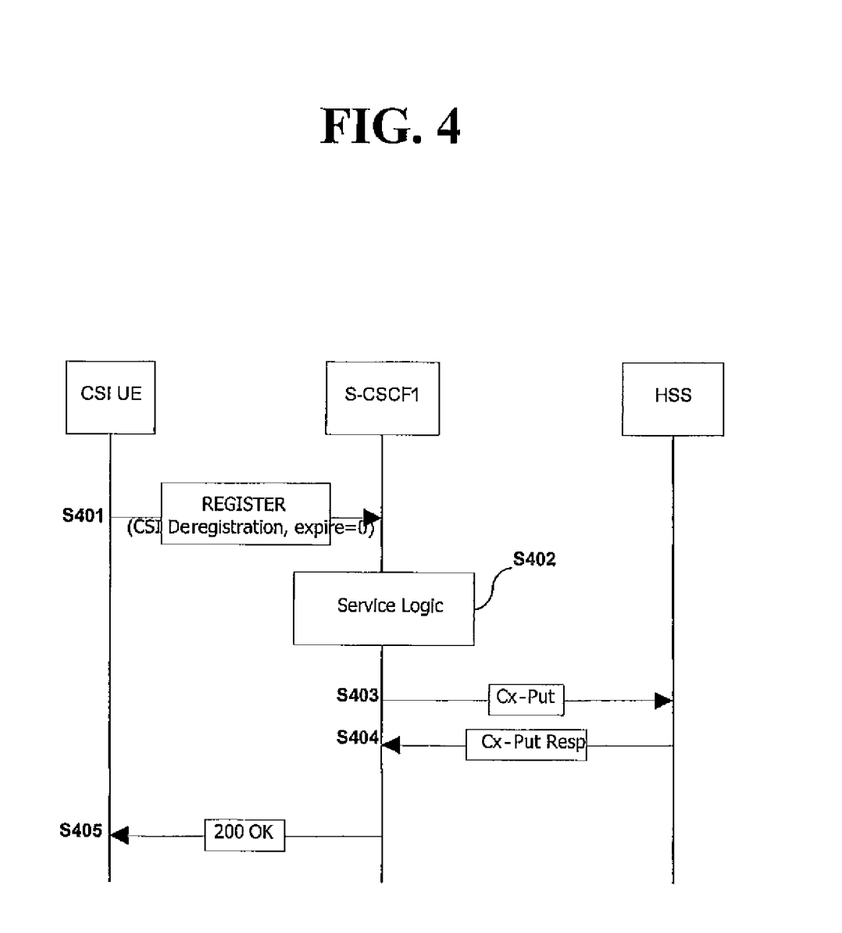
FIG. 4 is a block diagram illustrating another example of deregistration according to the present invention.

FIG. 4 is a block diagram illustrating another example of deregistration according to the present invention. The deregistration method including the steps S401 to S405 illustrated in FIG. 4 may be implemented according to the same operations as those in the deregistration method in FIG. 3 except for the following differences.

First, the CSI deregistration indicator at the step S401 is a newly-proposed indicator. That is, the deregistration method in FIG. 3 uses the CSI capability indicator of the registration process at the step S301. However, the deregistration method in FIG. 4 proposes a new CSI deregistration indicator.

Second, the newly-proposed CSI deregistration indicator may be either sent by the CSI UE upon the deregistration according to purposes or not. For example, in case where the CSI UE is turned off, the CSI UE may not send the CSI deregistration indicator, since the CSI AS does not have to transfer a request for establishing a session with the CSI UE toward the CS domain. Also, if a user of the CSI UE does not want to use the functions of the CSI UE under the IMS unregistered state, the CSI deregistration indicator may not be sent for the IMS deregistration. However, in case of a simple IMS deregistration, the CSI UE sends the CSI deregistration indicator such that it can use the functions thereof even in an IMS unregistered state.

That it, according to the uses, the indicator may be included in the deregistration process when desiring to transfer a session toward the CS domain under the unregistered state, and the indicator may not be included in the deregistration process when not desiring to use the functions of the CSI UE under the unregistered state of the CSI UE and when the CSI UE is power-off.

Another embodiment of storing the CSI capability indicator received during the registration process for use will be described with reference to FIG. 5.

In general, during the registration process the CSI UE sends to an IMS core a so-called 'CSI capability' indicator in order to inform the CSI AS that the CSI UE desires the CSI interworking.

The CSI indicator may be used for a third party registration. That is, the S-CSCF performs the third party registration into the CSI AS when receiving the corresponding indicator from the CSI UE. However, in the deregistration method of FIG. 5, in order to use the CSI service under the unregistered state, the CSI capability indicator received upon the registration may be separately stored in the S-CSCF. That is, the CSI capability indicator which has been received upon the registration can be stored by using specific variables and then storing it in the specific variables. Accordingly, the S-CSCF can recognize that the corresponding UE is the CSI capable UE. When receiving the deregistration message, the S-CSCF may determine whether the variable has been set in relation to the corresponding UE. If the variable has been set, the S-CSCF may recognize the corresponding UE is the CSI UE. Accordingly, the S-CSCF may perform an operation to support the CSI service in the unregistered state.

Figure 5:
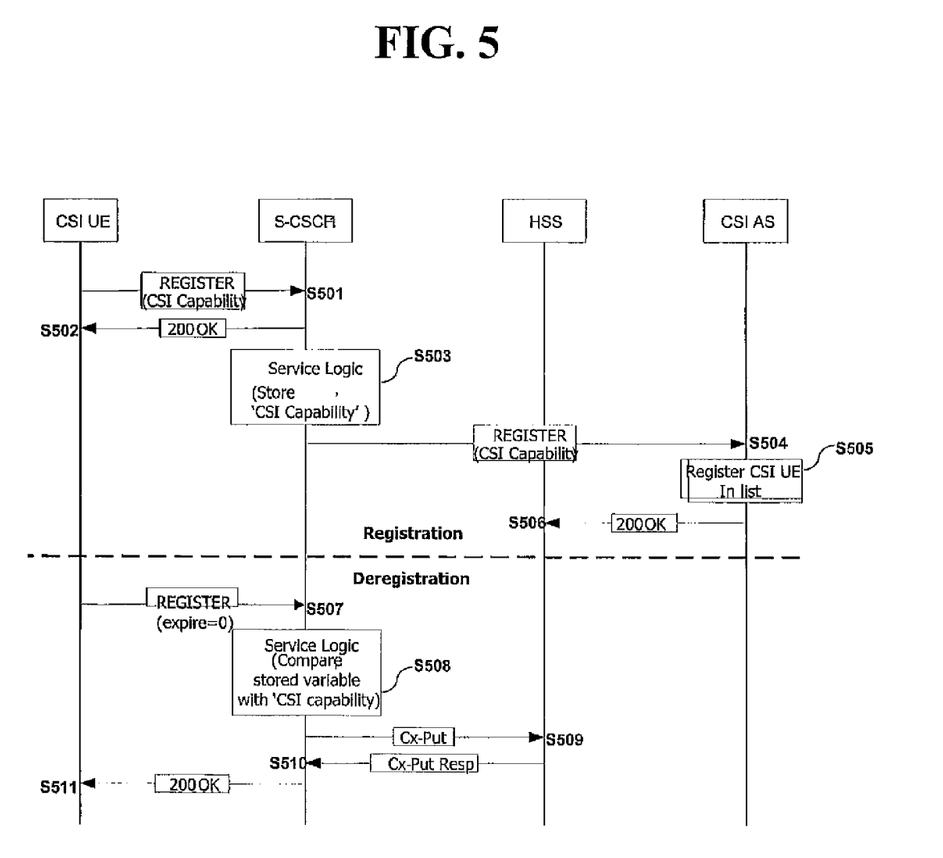
FIG. 5 is a block diagram illustrating another example of deregistration according to the present invention.

FIG. 5 is a block diagram illustrating another example of deregistration according to the present invention. As illustrated in FIG. 5, the CSI UE sends a REGISTER message for the registration to the S-CSCF1 (S501). Here, the CSI UE may include a CSI capability indicator in the REGISTER message such that it can inform the S-CSCF1 of its CSI capability to allow the performing of the $3^{rd}$ party registration.

The S-CSCF1 sends 200 OK in response to the registration (S502). The S-CSCF1 checks the CSI capability indicator and stores the checked information in a specific variable, thereby confirming that the corresponding UE is the CSI capable UE.

Then, the S-CSCF1 checks whether to perform the $3^{rd}$ party registration (S503). The S-CSCF1 sends the REGISTER message to the CSI AS according to the 'CSI capability' (S504).

The CSI AS having received the CSI capability from the S-CSCF1 adds (includes) the corresponding UE to a CSI UE list managed by itself (S505). The CSI AS then sends 200 OK to the HSS in response to the successful addition into the CSI UE list (S506).

The registration process is performed by the steps S501 to S506. The deregistration process will be described by the following steps S507 to S511.

That is, the CSI UE sends to the S-CSCF1 a deregistration message, or a REGISTER message for deregistration which includes an expiration time set to '0' (i.e., expire=0) (S507). The S-CSCF1 having received the message performs the deregistration so as to delete every profile related to a public user identity desiring to be deregistered. Also, the S-CSCF1 determines whether the CSI UE has the CSI capability by the comparison with a previously stored variable (S508). If it is determined at the step S508 that the UE has the CSI capability, the S-CSCF1 sends changed contents to the HSS by a Cx-Put command (e.g., state change, etc.) (S509).

The HSS then sends a response with respect to the Cx-Put to the S-CSCF1 (S510).

The S-CSCF1 sends a response to the CSI UE to inform the successful deregistration (S511). It can be noticed that the operation of the step S509 is the same as the operation of the step S301 in the deregistration method of FIG. 3.

As such, the deregistration method according to the present invention can be implemented in various embodiments.

Hereinafter, a call connection method in accordance with a first embodiment will be described.

The first embodiment is implemented such that CSI related information as to a CSI UE is additionally stored in the HSS. In related art, since the CSI is a non-subscription based service, and since the user and the CSI service do not have much commonness, the CSI related information may not be stored in the user profile of the HSS. Thus, when the CSI UE is in the unregistered state, a request for establishing a session with the CSI UE received via an IMS domain may not be transferred toward the CS domain.

Therefore, in the first embodiment of the present invention, whether an UE is a CSI UE is checked and additional CSI related information may be stored in the HSS, such that the CSI service can be available in the unregistered state. In general, the HSS may store the following data in relation to an IMS. These are used in every embodiment of the present invention, which can be indicated as shown in Table 1.

TABLE 1

| Name of field | Description |
| --- | --- |
| Private user identity | This is an ID to identify a subscriber used in IMS, namely, an ID used only in a network. |
| Public user identity | This is an ID to identify a public user, such as an e-mail. One user can have several public user identities, each of which is associated with a private user identity. |
| Unregistered state related service | This is a parameter defining whether an identity is associated with a service under an unregistered state. This is permanent subscriber data in HSS. |
| Implicitly registered public user identity set | This is a set of one or more public user identities. This is a set of public user identities which should be simultaneously registered when one user identity is registered. |
| S-CSCF name | This is the name of S-CSCF allocated to an IMS subscriber, i.e., an UE, when the UE is registered in an IMS domain. |
| AS name | This is the name of application server to host public user identity. |
| iFC | Several sets of iFC are stored in HSS for each user. iFC contains information related to an application or services requested or registered by a user. |
| CSI deregistration | This is information as to whether to perform a session transfer function toward a CS domain when the corresponding public user identity or UE (or URI) is under an IMS unregistered state (deregistration). |

When the CSI UE performs the deregistration process, the S-CSCF1 switches the registered state of the corresponding identity into an unregistered state based upon the Cx-Put. Here, by setting the 'CSI deregistration', even when the CSI UE is in the unregistered state, the S-CSCF does not send a Fail response message with respect to the SIP request but transfer the SIP request to the CSI AS for processing. Although the CSI is not the subscription based service, the CSI should be performed even in the unregistered state. Therefore, the CSI may be added to an unregistered state related service as a type of unregistered service.

The significant features as follows may be obtained in the first embodiment of the present invention.

First, the S-CSCF adds data indicating that the UE is capable of CSI and the name of a specific S-CSCF to the HSS by using a command provided via a Cx interface, such as Cx-Put. In order to add the data indicating that the UE is capable of CSI, the present invention provides a exemplary way to add a CSI interworking, as a new service, to an existing 'Unregistered state related service' field as shown in Table 1. Alternatively as shown in Table 1, the present invention provides a way to add a new field, i.e., 'CSI deregistration' filed, indicating a capability of the CSI UE to the HSS. Here, if the CSI interworking is processed like the existing unregistered service and then stored in the HSS, the CSI interworking related information (data) is updated in a user profile. That is, the iFC for the CSI interworking is added to the user profile. Therefore, the S-CSCF can download the user profile from the HSS to obtain the related iFC.

The S-CSCF also stores the name of S-CSCF which can install an iFC for the CSI interworking in the HSS by using the Cx-Put. Accordingly, it is possible to transfer a session to the S-CSCF which can support the CSI interworking when receiving a session under an unregistered state.

Second, the S-CSCF checks whether a value indicating that the UE is capable of CSI is included in a specific field, i.e., the new filed (the 'CSI deregistration' filed) or, the existing filed (the 'Unregistered state related service' filed) of the HSS when receiving the data from the HSS. When receiving data indicating that a UE having a specific user identity is the CSI UE, the S-CSCF may install the iFC for the CSI interworking therein.

The first embodiment having the above features will be described with reference to FIG. 6.

Figure 6:
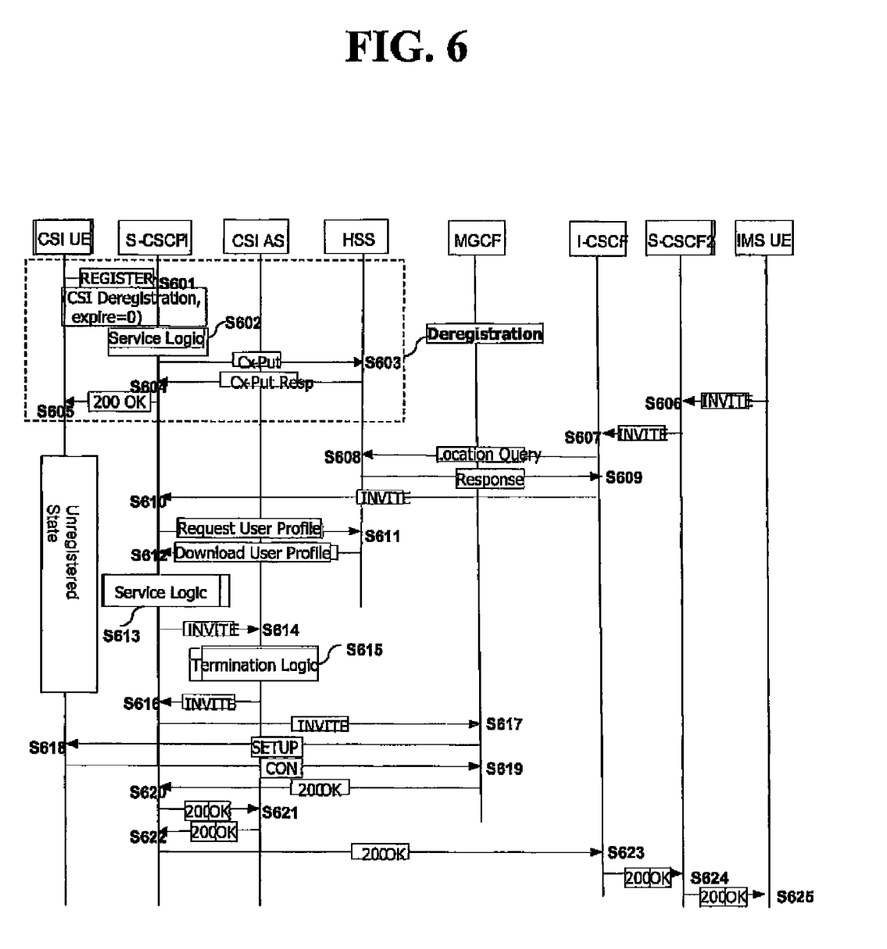
FIG. 6 is a block diagram illustrating an exemplary method for connecting a call in accordance with a first embodiment of the present invention.

FIG. 6 is a block diagram illustrating an exemplary method for connecting a call in accordance with a first embodiment of the present invention.

Referring to FIG. 6, the CSI UE sends a deregistration message or a REGISTER message to a S-CSCF1, the REGISTER message having a CSI deregistration indicator and an expiration time set to '0' (i.e., 'REGISTER (CSI deregistration, expire=0)' message) (S601).

The S-CSCF1 receives the deregistration message and performs the deregistration so as to delete every profile related to a public user identity desiring to be deregistered (S602).

The S-CSCF1 sends a Cx-Put command for the CSI interworking to an HSS (S603). The HSS sends a response with respect to the Cx-Put to the S-CSCF1 (S604). At the step S603, the additional CSI related information as explained above is characteristically sent to the HSS by the Cx-Put command in order to be stored in the HSS.

The S-CSCF1 sends a response to the CSI UE to inform the successful deregistration (S605).

The deregistration is performed through the steps S601 to S605 and thereafter a process of receiving an INVITE message is performed.

In particular, an IMS UE sends the INVITE message to an S-CSCF2 for the communication with the CSI UE (S606).

The S-CSCF2 performs a service logic to acquire an address of an I-CSCF, thereby sending the INVITE message to the I-CSCF using the acquired address (S607).

The I-CSCF sends a location query of a termination UE to the HSS (S608). The I-CSCF receives location information related to the termination UE from the HSS (S609). At the step S609, the location information may include the address of the S-CSCF1 to which the I-CSCF will route the received SIP message for the CSI interworking. Also, the location information may include information for indicating that a service is available under an unregistered state, (i.e., the CSI interworking is available) even if the corresponding public user identity is in unregistered state. This information may be the information stored in the HSS at the step S603. That is, the information related to the CSI interworking may be stored in the HSS together with the name of S-CSCF to process the CSI interworking through the deregistration process.

The I-CSCF sends the INVITE message to the S-CSCF1 based upon the information received from the HSS at the step S609 (S610).

The S-CSCF1 has not stored the user profile of the corresponding CSI UE because the CSI UE was in the unregistered state. Accordingly, the S-CSCF1 attempts to download the related user profile from the HSS (S611). The HSS sends the user profile corresponding to the received public user identity to the S-CSCF1 (S612).

Two different methods can be performed for the S-CSCF1 to download the user profile at the step S612.

First, the user profile may be entirely downloaded. The CSI interworking can be considered as an unregistered service such as "Call Forward", "Voice Mailbox" or the like. Accordingly, it may be included in the iFC of the user profile as one unregistered service. The iFC is stored by the process of adding the CSI interworking and the related information to the user profile of the HSS during the deregistration process. That is, since the IFC for the CSI interworking has been stored in the HSS, the S-CSCF1 can download the iFC.

Second, the user profile may be partially downloaded. The information related to the CSI interworking is stored in the HSS to thusly be downloaded from the HSS. In this method, only the information for checking the CSI interworking is downloaded other than the entire user profile. Upon receiving the related data, the S-CSCF installs the iFC for the CSI interworking therein. The S-CSCF will then transfer the session terminated by the CSI UE to the CSI AS based upon the iFC.

After the step S612, the S-CSCF1 analyzes the iFC of the user profile received from the HSS (i.e., refer to the first method) or analyzes the iFC for the CSI interworking installed in the S-CSCF1 (i.e., refer to the second method), thereby recognizing a service in the unregistered state.

The S-CSCF1 then determines whether to transfer a SIP message to the CSI AS (S613). That is, the S-CSCF1 checks CSI capability information related to the CSI UE included in the iFC received at the step S612. If the CSI capability information indicates a session transfer toward the CS domain under the IMS unregistered state, the S-CSCF1 may send the INVITE message to the CSI AS (S614). Conversely, if the CSI capability information does not indicate the session transfer toward the CS domain under the IMS unregistered sate, the S-CSCF1 may send a Fail response message to the IMS UE which sent the INVITE message.

The CSI AS performs a termination logic to determine whether to either transfer the received INVITE message toward the CS domain or split the message (S615).

If it is determined to transfer the SIP message (i.e., INVITE) received at the step S613 toward the CS domain, the CSI AS changes the destination of the INVITE message into the CS domain to send the message to the S-CSCF1 (S616). The S-CSCF1 sends the INVITE message to a MGCF (Media Gateway Controller Function) in order to send it to the CS domain (S617).

The MGCF sends a setup message to the CS domain of the CSI UE by mapping SIP to ISUP (S618). The CSI UE sends a CON message as a client open message to the MGCF (S619). The MGCF converts the CON message into a 200 OK message by mapping ISUP to SIP and sends the converted message to the S-CSCF1 (S620).

The S-CSCF1 sends the received 200 OK message to the CSI AS (S621). The CSI AS sends the 200 OK message to the S-CSCF1 in order to send the 200 OK message to the IMS UE which sent the initial INVITE message (S622).

The S-CSCF1 sends the received 200 OK to the I-CSCF (S623). The I-CSCF sends the 200 OK to the S-CSCF2 (S624). The S-CSCF2 eventually sends the received 200 OK to the IMS UE (S625).

Through the steps S601 to S625, the call connection method according to the first embodiment can be implemented.

Hereinafter, a call connection method in accordance with a second embodiment will be described.

In the second embodiment, the additional CSI related information is stored in the S-CSCF. In general, when receiving a session request in the IMS domain, the S-CSCF may determine how to process the received request based upon an iFC, namely, to which entity the session is to be transferred. The iFC may be sent to the S-CSCF by being included in the user profile downloaded from the HSS when a terminal is registered. However, the iFC may be deleted after the deregistration process is performed.

In case of the CSI, every voice component session should be transferred toward the CS domain regardless of the IMS registered state. In the IMS registered state, a UE may transfer information indicating that it is the CSI UE to an IMS core through the registration process. However, in the IMS unregistered state, since the CSI is not the subscription based service, any related information is not stored in the HSS. Accordingly, it is impossible to send a session to the CS domain.

Therefore, in the second embodiment, if the S-CSCF recognizes that the terminal performing the deregistration is the CSI UE through the deregistration method illustrated in FIGS. 3 to 5, an iFC for the CSI interworking can be generated so as to allow the iFC to be used even under the unregistered state.

Until before re-performing the registration, the session included in every voice component should be sent to a specific S-CSCF (i.e., an S-CSCF having the iFC) to be processed thereby. Accordingly, during the deregistration process, the S-CSCF may transfer its URI address to the HSS when sending Cx-Put thereto.

That is, in the second embodiment, there are two significant features as follows.

First, the iFC for the CSI interworking is installed in the S-CSCF. In related art, the S-CSCF deletes every user profile related to a public user identity intending to perform the deregistration when receiving a deregistration message. However, the present invention holds the iFC for the CSI interworking by installing the iFC for CSI interworking for the CSI interworking in order for the iFC to be used even under the unregistered state. The iFC for the CSI interworking may be either a shared iFC or a specific iFC.

In case of the shared iFC, the S-CSCF may manage, under a state of having one shared iFC, lists for public user identities of CSI UEs which are in the unregistered state.

In case of having the specific iFC, the S-CSCF may manage both a public user identity and the iFC corresponding to the public user identity.

An exemplary iFC as above described is represented as follows. The following iFC is one of the iFC for the CSI interworking for transferring a session to the CSI AS when a session including a voice component has been received, for example.

| Initial Filter Criteria of CSI Interworking |
| --- |
| Application Server Address: CSI-AS.operator.com<br>Trigger point:<br>Method = INVITE AND Request-URI= CSI-unregistered_user@lge.com<br>AND<br>mediatype = voice<br>Handling: Proxy<br>Priority: x |

"Initial Filter Criteria of CSI Interworking" is the iFC according to the first embodiment of the present invention. "Application Server Address: CSI-AS.operator.com" indicates an address of an AS (Application Server) which can perform a service logic of the iFC according to the second embodiment. That is, if a received SIP message is matched with a trigger point, the SIP message may be sent to the address.

The trigger point determines whether a message is the SIP message for performing the corresponding service logic and then lists conditions to transfer the SIP message to the application server. The conditions may include a method type, a target user identity, a media type and the like which are configured using conditional statements such as AND and/or OR. The above example specifies conditions of triggering a received session in case where the method type is an INVITE message, a request-URI is CSI-unregistered user@lge.com and the media data is voice.

Second, an URI address of a specific S-CSCF is stored in the HSS by the Cx-Put command (i.e., 'Cx-Put (public user identity, private user identity, and keep S-CSCF name)'). The Cx-Put may have the following format. The 'keep S-CSCF name' denotes the name of S-CSCF having the iFC installed for the CSI interworking. Therefore, another S-CSCF can obtain the name of the S-CSCF capable of processing the session, when the another S-CSCF receives a session connection request with an unregistered CSI UE.

The second embodiment with the two features as explained above may support the CSI interworking under the unregistered state. The I-CSCF receives the address of the S-CSCF from the HSS to transfer a session thereto. The S-CSCF transfers the session to the CSI AS based upon the iFC installed for the CSI interworking.

The second embodiment having the above features will be described with reference to FIG. 7.

Figure 7:
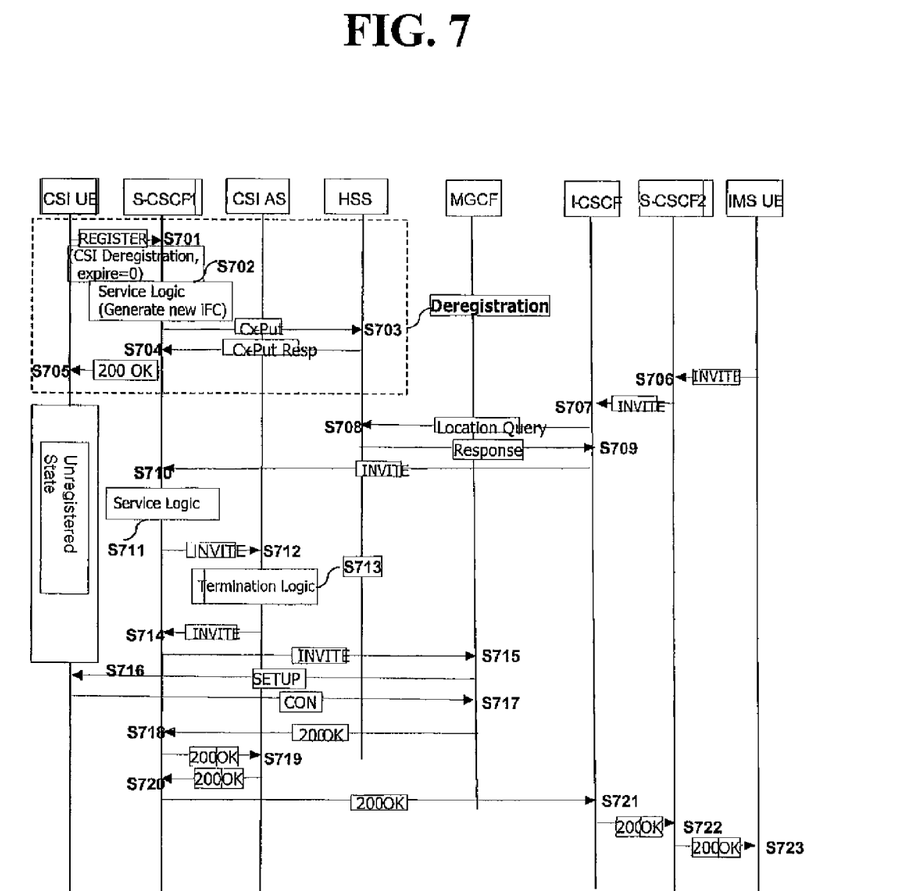
FIG. 7 is a block diagram illustrating an exemplary method for connecting a call in accordance with a second embodiment of the present invention.

FIG. 7 is a block diagram illustrating an exemplary method for connecting a call in accordance with a second embodiment of the present invention.

As illustrated in FIG. 7, the CSI UE sends to the S-CSCF1 a deregistration message or the REGISTER message having a CSI deregistration indicator and an expiration time set to '0' (i.e., 'REGISTER (CSI deregistration, expire=0)') (S701).

After receiving the deregistration message, the S-CSCF1 performs the deregistration so as to delete every user profile related to a public user identity desiring to be deregistered and simultaneously generates a new iFC for the CSI interworking (S702).

The S-CSCF1 sends a Cx-Put command for the CSI interworking to the HSS (S703). The HSS sends a response with respect to the Cx-Put to the S-CSCF1 (S704). The S-CSCF1 sends a response to the CSI UE to inform the successful deregistration (S705).

At the step S702, it is characteristic that the new iFC for the CSI interworking is generated in the S-CSCF previously described.

The deregistration is performed through the steps S701 to S705. Hereinafter, a process of sending an INVITE message to the CS domain is described based upon the steps S706 to S723.

In particular, the INVITE message for the communication with the CSI UE is sent from the IMS UE to the S-CSCF2 (S706).

The S-CSCF2 performs a service logic to obtain the address of the I-CSCF, and sends the INVITE message to the I-CSCF by using the obtained address (S707).

The I-CSCF sends a location query of a termination UE to the HSS (S708). The I-CSCF receives location information related to routing of the termination UE (e.g., an S-CSCF address, etc.) from the HSS (S709).

The I-CSCF sends the INVITE message to the S-CSCF1 based upon the information received from the HSS (S710).

The S-CSCF1 has stored the iFC generated for the CSI interworking during the deregistration process of the step S702. Accordingly, the S-CSCF1 checks the corresponding public user identity. Afterwards, the S-CSCF1 analyzes the iFC to check whether there is an available service under the unregistered state, thereby determining whether to transfer a SIP message to the CSI AS (S711). That is, the S-CSCF1 checks CSI capability information on the CSI UE included in the iFC generated at the step S702.

If the CSI capability information indicates that the session transfer toward the CS domain is possible under the IMS registered state, the S-CSCF1 may send the INVITE message to the CSI AS (S712).

Alternatively, if the CSI capability information does not indicate that the session transfer toward the CS domain is possible under the IMS registered state, the S-CSCF1 may send a Fail response message to the IMS UE having sent the INVITE message.

The CSI AS performs a termination logic to determine whether to transfer the received INVITE message to the CS domain or split the message (S713).

If it is determined to send the SIP message received at the step S711 to the CS domain, the CSI AS changes the destination of the INVITE message into the CS domain to send the INVITE message to the S-CSCF1 (S714). The S-CSCF1 sends the INVITE message to the MGCF in order to send it to the CS domain (S715).

The MGCF sends a setup message to the CS domain of the CSI UE by mapping SIP to ISUP (S716). The CSI UE sends a CON message as a client open message to the MGCF (S717). The MGCF converts the CON message into a 200 OK message by mapping ISUP to SIP and sends the converted 200 OK message to the S-CSCF1 (S718).

The S-CSCF1 sends the received 200 OK message to the CSI AS (S719).

The CSI AS sends the 200 OK message to the S-CSCF1 so as to send the 200 OK message to the IMS UE having sent the initial INVITE message (S720).

The S-CSCF1 delivers the received 200 OK message to the I-CSCF (S721). The I-CSCF sends the 200 OK message to the S-CSCF2 (S722). The S-CSCF2 eventually sends the received 200 OK message to the IMS UE (S723).

Through the steps S701 to S723, the call connection method according to the second embodiment can be implemented.

The present invention has been explained with reference to the embodiments which are merely exemplary. It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Effect of the Invention

In accordance one aspect of the present invention, even if a terminal receives a call connection request message over an IMS under an IMS unregistered state, it is possible to transfer the call to a CS domain based upon information as to whether to perform a session transfer.

In accordance another aspect of the present invention, even if a terminal is in the CS domain under the IMS unregistered state, a call transferred from the IMS domain can be effectively received.

The invention claimed is:

1. A method for connecting a call in a server between an IP Multimedia Subsystem (IMS) domain and a circuit switched (CS) domain for performing a call connection function with respect to at least one terminal, the method comprising:
receiving, by the server, a first domain call connection request message for at least one target terminal from at least one terminal;
checking, by the server, user profile information related to the target terminal; and
selectively performing, by the server, a call transfer toward a second domain based upon the user profile information,
wherein the user profile information is obtained from a subscriber information server or HSS (Home Subscriber Server), and
wherein the user profile information is stored by a S-CSCF (Serving Call Session Control Function) during an IMS deregistration process.

2. A method for connecting a call in a server between an IP Multimedia Subsystem (IMS) domain and a circuit switched (CS) domain for performing a call connection function with respect to at least one terminal, the method comprising:
receiving, by the server, a first domain call connection request message for at least one target terminal from at least one terminal;
checking, by the server, user profile information related to the target terminal; and
selectively performing, by the server, a call transfer toward a second domain based upon the user profile information,
wherein the user profile information is obtained from a subscriber information server or HSS (Home Subscriber Server), and
wherein the user profile information comprises at least CSI capability information.

3. The method of claim 2, wherein the CSI capability information is indicator information indicating whether to transfer a session toward a CS domain under an IMS unregistered state.

4. The method of claim 3, wherein the indicator information is received by being included in DEREGISTER message.

5. A method for connecting a call in a server between an IP Multimedia Subsystem (IMS) domain and a circuit switched (CS) domain for performing a call connection function with respect to at least one terminal, the method comprising:
- receiving, by the server, a first domain call connection request message for at least one target terminal from at least one terminal;
- checking, by the server, user profile information related to the target terminal; and
- selectively performing, by the server, a call transfer toward a second domain based upon the user profile information,
- wherein the user profile information is stored in the server, and
- wherein the user profile information is the information stored during a registration process of the target terminal.

6. The method of claim 1, wherein the user profile information comprises at least CSI capability information.

7. The method of claim 6, wherein the CSI capability information is indicator information indicating whether to transfer a session toward a CS domain under an IMS unregistered state.

8. The method of claim 7, wherein the indicator information is received by being included in a REGISTER message.

9. A method for connecting a call in a server between an IP Multimedia Subsystem (IMS) domain and a circuit switched (CS) domain for performing a call connection function with respect to at least one terminal, the method comprising:
- receiving, by the server, a first domain call connection request message for at least one target terminal from at least one terminal;
- checking, by the server, user profile information related to the target terminal; and
- selectively performing, by the server, a call transfer toward a second domain based upon the user profile information,
- wherein the user profile information comprises at least user initial Filter Criteria (iFC) information,
- wherein the user profile information comprises at least information as to whether to perform a session transfer toward a CS domain under an IMS unregistered state.

10. A method for connecting a call in a server between an IP Multimedia Subsystem (IMS) domain and a circuit switched (CS) domain for performing a call connection function with respect to at least one terminal, the method comprising:
- receiving, by the server, a first domain call connection request message for at least one target terminal from at least one terminal;
- checking, by the server, user profile information related to the target terminal; and
- selectively performing, by the server, a call transfer toward a second domain based upon the user profile information, and
- wherein the call transfer toward the second domain is performed in case where an initial Filter Criteria (iFC) indicates the session transfer toward the CS domain under an IMS unregistered state.

11. The method of claim 10, further comprising converting the call connection request message into the call connection request message of the second domain by an application server and transferring the converted message to the target terminal.

12. The method of claim 11, wherein the application server is a MGCF (Media Gateway Controller Function).

13. A method for connecting a call comprising:
- transferring, by a UE (User Equipment) in a second domain, a message including information as to a call transfer operation toward the second domain to a server during a deregistration of a first domain;
- receiving, by the UE in the second domain, a call connection request message via the second domain from the server; and
- sending, by the UE in the second domain, a response message for the received call connection request message to the server.

14. The method of claim 13, wherein the message is either an IMS REGISTER message or an IMS DEREGISTER message.

15. The method of claim 13, wherein the call connection request message is transferred by converting the call connection request message of the first domain into the call connection request message of the second domain according to user profile information related to a user or URI.

16. The method of claim 15, wherein the user profile information indicates whether to perform a session transfer toward a CS domain under an IMS unregistered state of a terminal or URI.

* * * * *